UNITED STATES PATENT OFFICE.

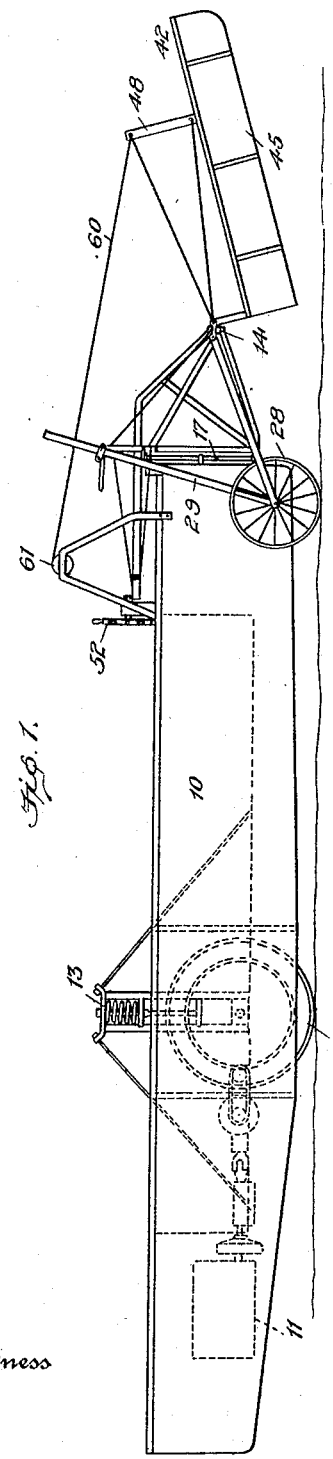

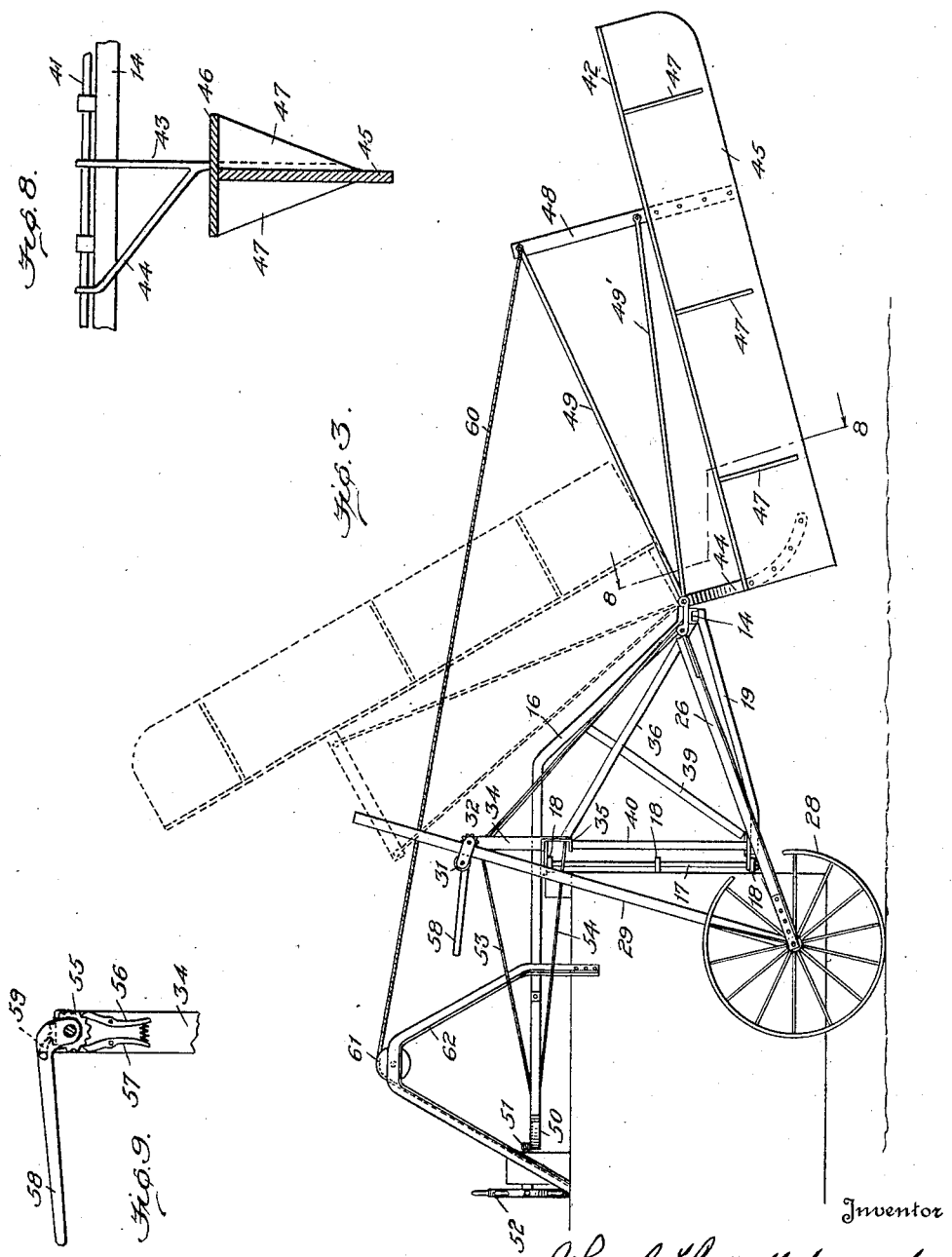

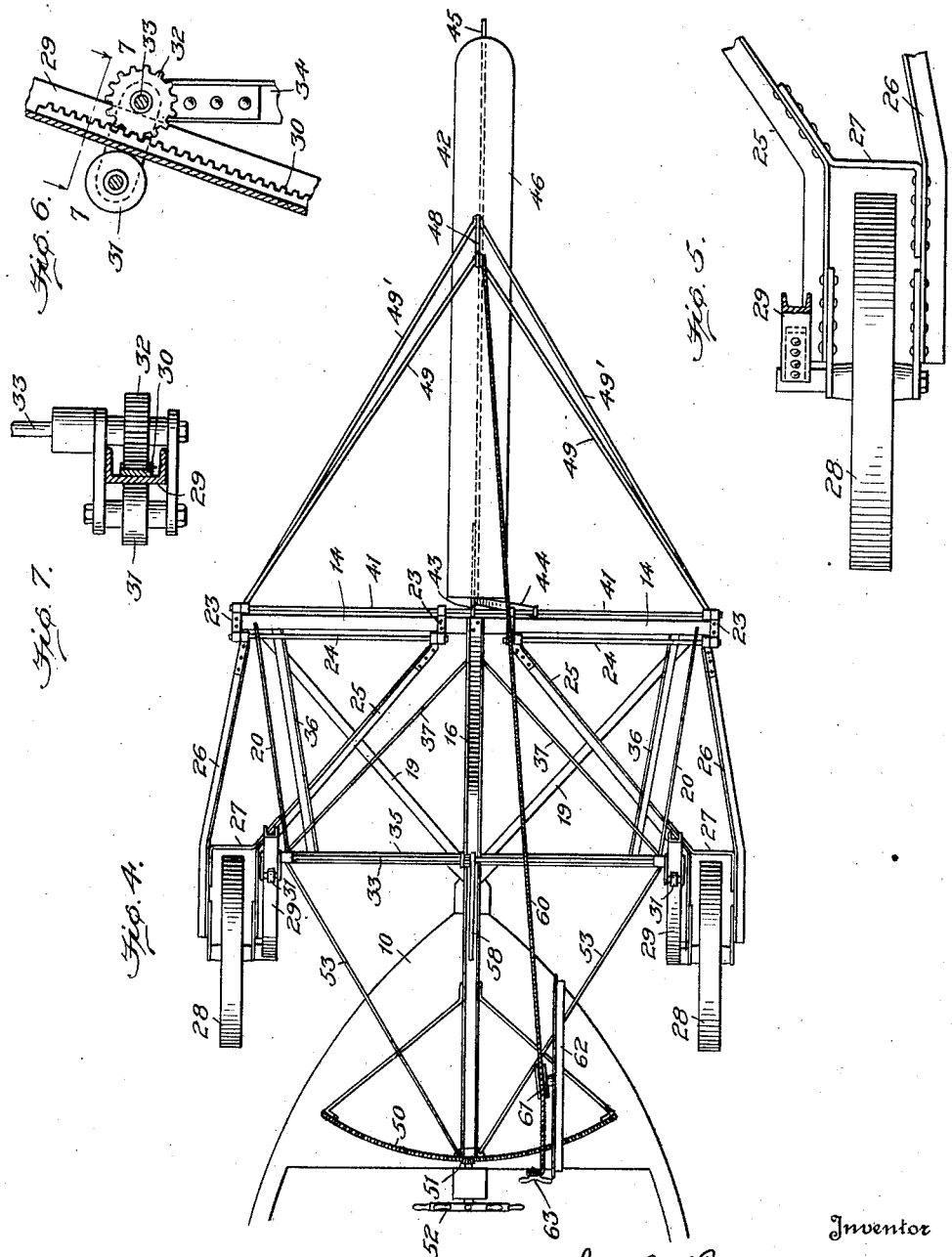

JOHN A. HOWELL, DECEASED, LATE OF WARRENTON, VIRGINIA, BY BELLE HOWELL BOHN AND FRANCES A. NEVILLE, EXECUTORS, OF WASHINGTON, DISTRICT OF COLUMBIA.

WHEELED BOAT.

1,395,112.          Specification of Letters Patent.      Patented Oct. 25, 1921.

Application filed January 10, 1920. Serial No. 350,625.

*To all whom it may concern:*

Be it known that JOHN A. HOWELL, U. S. N., deceased, late a citizen of the United States, and resident of Warrenton, in the county of Fauquier and State of Virginia, invented certain new and useful Improvements in Wheeled Boats, of which the following is a specification, reference being had therein to the accompanying drawing.

This invention relates to beach or surf boats provided with driving wheels and a rudder all arranged to be raised at will from their operative positions.

Preferably the boat is provided with power devices for propelling it, either on land or water, but the present invention pertains to steering the boat while it is advancing on either land or water.

In the accompanying drawings,—

Figure 1 is a scale view showing a boat constructed in accordance with the invention.

Fig. 2 is an enlarged perspective view of a steering frame, shown also in Fig. 1.

Fig. 3 is a side view of the stern of the boat with the steering mechanism in place.

Fig. 4 is a plan view of the devices of Fig. 3.

Fig. 5 is a plan view showing the mounting of one of the steering wheels.

Fig. 6 is a detail sectional elevation of wheel raising devices.

Fig. 7 is a section on the line 7—7, Fig. 6.

Fig. 8 is a cross section of the rudder on the line 8—8, Fig. 3.

Fig. 9 is a detail view of pawl and ratchet devices for raising the wheels.

In these figures, 10 represents the body of a boat containing an engine 11 arranged for driving a vertically movable traction wheel 12 which when the boat is on land usually projects below the bottom of the boat but which may be raised above the bottom at will, it being supported by a spring 13 and arranged to be moved vertically in an inclosure in which it lies.

In the rear of the boat a cross bar 14, is rigidly attached to channel bars 15, 16, which extend forward and are pivoted to the upper and lower parts respectively of a vertical rod 17 carried by rigid brackets, 18, 18, projecting from the stern of the boat. To the bar 14 are fixed bearing members 23 for rods 24, 24, from each of which arms 25, 26 project obliquely forward and are rigidly fixed to a frame 27 in which is mounted a steering wheel 28. From the bearing of each wheel a bar 29 provided with a rack 30, which an idler wheel 31 holds in engagement with a pinion 32 on a shaft 33 extending across the machine and supported by brackets of posts 34, rising from a cross bar 35 parallel to the bar 14 and connected thereto by braces. The posts 34 are braced by the rods 20, and by rods 37 extending to the bar 16 as well as by braces 38 from the bar 35, and this frame is further braced by a bar 39 and members 40. A rod 41 is also mounted in the bearings 23, and on the rod the rudder 42 is pivoted to swing vertically by means of a bar 43 and a brace bar 44, both rigidly fixed to the rudder. The rudder consists of a long and broad thin vertical blade 45, having its upper edge fixed to a transverse stiffening plate 46, the blade and plate being further connected and made rigid by braces 47. From the rudder rises a central post 48 from the upper and lower parts of which brace rods 49, 49' run to points near the end bearings 23.

The central bar 16 runs forward from the pivotal rod 17 and bears at its forward end a quadrant 50 which is engaged by a pinion 51 upon a shaft of a common hand wheel 52, and the forward end of the bar is held in alinement by brace rods 53, 54, extending to the bar 35 and posts 34.

The shaft 33 bears near its middle a pinion 55 engaged below by two spring parts 56, 57, and forced to rotate when desired by a hand wheel 58 carrying a pawl 59 which engages the pinion 55. By this means, the two steering wheels 28 may be allowed to rise with respect to the boat or may be forced down when desired.

The rudder is raised at will by means of a cable 60 attached to its post 48 or other suitable part, and passing over a pulley 61 carried by a frame 62, supporting it from the boat, and thence to any suitable holding device 63, Fig. 4.

If the boat be on the beach, or land, the rudder may be raised and the driving wheel 12 and the steering wheels may be forced down so that the boat is above the earth with most of its weight resting upon the wheel 12. It may now be driven forward or rearward by the engine and may be steered by swinging the quadrant, and entire frame which bears the wheels, about the shaft 17. When the boat has been thus forced into water where the depth is sufficient to float it, the rudder is lowered and the wheels are raised. As the whole rudder structure, raised or not, swings with the quadrant, the boat is as readily steered as when on land.

When a landing is to be made on a gently sloping beach, the rudder is raised, the wheels are lowered, and the boat passes out of the water like a power driven land vehicle. If the boat be properly made there is no danger in passing through a heavy surf such as makes ordinary small craft nearly or quite useless. It may be noted that the rudder, since it swings up out of danger when shallow water is reached, may be such as to offer a very large surface to the water and so exert a powerful steering force. Obviously its use is not limited to hand operation.

What is claimed is:

1. The combination with a boat, of a frame mounted directly in the rear of the boat's stern to swing laterally from side to side, and a rudder arranged in the rear of the frame to swing therewith and to swing vertically with respect to the frame.

2. The combination with a boat having in its rear a frame mounted to swing laterally from side to side, of a rudder attached to the rear of the frame, swinging therewith and also capable of vertical swinging, with respect to the frame, into and out of operative position, boat-supporting wheels mounted upon the frame, and means for moving the wheels upward and downward into and out of position for supporting the boat from the ground.

3. The combination with a boat, of a broad rigid frame pivoted to swing laterally from side to side about an axis near the boat's stern, a rudder pivoted to said frame to swing upwardly, only, into and out of operative position, and vertically adjustable ground-engaging wheels mounted upon said frame upon opposite sides of the axial plane of the boat.

4. The combination with a boat of a frame pivoted to the stern of the boat to swing from side to side, ground wheels mounted, respectively, upon opposite sides of said frame and adjustable in height, a rudder projecting in the rear of said frame and arranged for movement in a vertical direction into and out of operative position, and means for swinging the frame and rudder together from side to side.

5. The combination with a boat, of steering, boat-supporting wheels near the boat's stern, a rudder projecting to the rear of the boat, means for swinging both wheels and rudder from side to side, means for rendering the wheels inoperative as boat supports, when desired, and means for independently rendering the rudder inoperative.

In testimony whereof we hereunto affix our signatures.

BELLE HOWELL BOHN,
FRANCES A. NEVILLE,
*Executors of the last will and testament of John A. Howell, deceased.*